2,856,354

LOST CIRCULATION RECOVERING MATERIAL

Arthur L. Armentrout, Long Beach, Calif.

No Drawing. Application July 2, 1954
Serial No. 441,149

13 Claims. (Cl. 252—8.5)

This invention relates to a method and composition for recovering lost circulation which has been lost in the course of drilling wells with a rotary well drilling apparatus.

The invention may be regarded as an improvement over the disclosures made in my prior United States Letters Patent No. 2,642,268, issued June 16, 1953, and No. 2,634,098, issued April 7, 1953. The application may be regarded as a continuation-in-part of the subject matter disclosed in my application for United States Letters Patent Serial No. 367,029, filed July 9, 1953, now abandoned.

In the first of the above-mentioned patents I have disclosed a method of recovering lost circulation that has been lost in the course of drilling a well which consists of pressure compacting into lumps of as large a size as may be reasonably expected to pass through the circulation ports in a bit of a finely divided material which will commence setting up on contact with the circulation fluid. These lumps are fed into the circulation fluid as it is forced into the well down the drill string. Due to the pressure compacting of the lumps the setting up action will be delayed until the lumps may have had an opportunity to reach the location or locations where circulation is being lost. Although the exterior surfaces of the lumps will commence setting up immediately upon contact with the circulation fluid, the setting up of the material forming the centers of the lumps is delayed due to the pressure compacting and the delay in the circulation fluid penetrating to the centers of the lumps.

In the second of the above-mentioned patents I disclose the use of lumps of an expandable material such as dehydrated expandable bentonite clay wherein the lumps are coated with water-soluble coatings. The time involved in dissolving the water-soluble coating provides a time-delay, delaying the time in which the enclosed expandable bentonite clay will be wetted by the circulation fluid. Consequently, expansion of the bentonite clay is postponed until the lumps have an opportunity to reach the location or locations where circulation fluid is being lost. During the time involved in transmitting the lumps to the locations where circulation fluid is being lost, the water-soluble coating dissolves exposing the bentonite clay which becomes wetted by the circulation fluid near these locations and thus expands in the locations and blocks further loss of circulation fluid.

In my application above referred to, I have disclosed lumps or pellets of dehydrated expandable type bentonite clay coatings with a water insoluble coating wherein provision is made for a slow ingress of water through the coating to the enclosed lump of clay. The delay involved in permitting or enabling water to wet the enclosed lump of clay delays the expansion of the bentonite clay until the lumps have had an opportunity to be transmitted by the circulation fluid to the locality where circulation is being lost.

Where the material used is in the form of relatively large lumps, pellets, or pills of dehydrated, expandable type clay coatings with either a water insoluble coating or a water-repellant coating, or even a water soluble coating, the coatings may be broken or abraded off while the lumps are being carried by the circulation fluid down the drill string. When the coatings are broken or abraded off the expandable type bentonite clay is immediately exposed to water and may commence its expansion long before it has had an opportunity to reach the location where circulation fluid is being lost. Also, where lumps are relatively large, regardless of whether they are coated or uncoated, they may become broken or fractured in the course of their travel down the drill string, exposing faces or relatively large surface areas that may immediately come in contact with the circulation fluid so that expansion of the bentonite clay commences before reaching the locality where circulation fluid is being lost.

One object of the present invention is to provide an improved method and composition for recovering lost circulation in drilling wells where the material used consists of finely divided particles of dehydrated, expandable type bentonite clay each of which is coated at least partially with a water-repellant coating. If the particles are of relatively small size and are coated or partially coated, danger of their fracturing into still smaller particles is reduced and danger of abrading away or breaking off their coatings is likewise reduced. If the particles that are individually coated or partially coated are bonded together or held in lump form prior to their introduction into the circulation fluid, danger arising of exposing particles of the clay to the wetting action of the circulation fluid as a result of fracture of the lumps is avoided inasmuch as each particle is individually coated or partially coated. Consequently, if the lump fractures it merely exposes on the fracture surface particles of bentonite clay which are still coated. Similarly, if lumps of particles which are individually coated and which are bonded together are subjected to abrasion as they travel down the drill string external particles may have their coatings abraded away and may become wetted by the circulation fluid. However, subjacent particles will continue to have their coatings or partial coatings and will continue to be protected thereby until they have had an opportunity to reach the locations where circulation fluid is being lost.

By means of the present composition wherein the lumps, pellets or pills are made up of a multiplicity of finely divided particles of expandable type, dehydrated bentonite clay, each of which are individually coated or largely protected by the surrounding water-repellant, it is possible to more accurately delay or postpone the expansion of the bentonite clay over a much longer period of time than in situations where abrasion or fracture of the coating surrounding the entire lump or pellet results in an immediate exposure of a large portion or surface of the bentonite clay to the wetting action of the circulation fluid.

Another object of the present invention is to provide an improved water-repellent coating which may also function as a bonding agent, bonding the individual small particles of clay together into lumps or pellets. Such a bonding agent may have variable characteristics that are controllable and are adjustable to prolong the period in which the bentonite clay will be protected thereby to any desired length of time. It will be understood that in certain circumstances it may be desired that the bentonite clay be wetted and allowed to expand in a relatively short period of time. In other circumstances, such as where circulation is lost near the bottom of a deep well, it may be desired to have the bentonite clay expand only after the delay of a considerable period of time.

Another object of the invention is to provide a composition for use in recovering lost circulation in wells wherein there is a condition commonly referred to as a "weeping" lost circulation problem. In such wells the interstices, cracks, or crevices through which the circulation fluid is being lost are so small that circulation is not entirely lost but there is, nevertheless, a continuous and small loss of circulation fluid. Under these circumstances the use of large lumps or pellets is impractical as the cracks and crevices are so small that the large lumps or pellets cannot enter and become lodged therein to form the desired barrier against further loss of fluid. The use of fine particles individually coated or protected by a water-repellant that will resist water penetration into the fine particles until they have had an opportunity to reach the cracks and crevices and become lodged therein and thereafter expand, is highly desirable under such circumstances.

With the foregoing and other objects in view which will be made manifest in the following detailed description, it will be appreciated that the disclosures herein made are merely illustrative of the present invention.

One preferred method of preparing a composition embodying the present invention is to first prepare a solution. This is prepared by mixing five pounds of urea-formaldehyde with 38 pounds of water. These ingredients are mixed together thoroughly and .05 lb. of ammonium chloride and .05 lb. of ammonium sulphate are added if it is desired to hasten the setting of the urea-formaldehyde. The proportions given produce approximately five gallons of the solution.

To make the lumps or pellets embodying the present invention, 95 lbs. of dehydrated expandable type bentonite clay are finely ground to approximately 100 mesh and smaller. To this quantity of finely divided, expandable type bentonite clay the five gallons of the solution above described are added. These ingredients are mixed well until the bentonite become doughy or putty-like in consistency. The mixture is then put through a primary extruder to assure a thorough mixing and thereafter is put through a final extruder at a pressure of from 1000 to 4000 lbs. per square inch. It is extruded to the desired shape, length, and size. A suitable size is from 1/16" in diameter and length to 1/2" in diameter and length. The size and length may even exceed 1/2" if occasion requires. The extruded pellets are cured and dried at a temperature of from 70° F. to 90° F. in dry air for approximately twenty-four hours. This drying may occur either at atmospheric pressure or under a vacuum.

In drying and curing, the urea-formaldehyde film develops microscopic cracks and holes on each particle which allows water to enter slowly to combine with or wet the bentonite. Each pellet or pill may be regarded as having been composed of many small particles, each of which is coated and then compressed and bonded together to make a large pellet that, in turn, has a coating provided by the external particles as disclosed in my copending application Serial No. 367,029, filed July 9, 1953.

Hide glue, bone glue, or glycerin, can be used in lieu of urea-formaldehyde, using approximately 5 lbs. of either hide glue, bone glue, or glycerin to 38 lbs. of water which is mixed with approximately 95 lbs. of finely divided dehydrated, expandable type bentonite clay.

The percentage of the chemicals to the water can be varied to a large extent but the percentages given seem to produce the best results.

Water alone can be used and makes a fair delayed-action bentonite pellet. However, I prefer to use urea-formaldehyde as pellets made with this composition will withstand fairly high temperatures of from 200° F. to 300° F. which are encountered in deep wells without deteriorating. Each pellet or pill is relatively hard, tough, and of a uniform heterogeneous structure that will withstand rough handling. Where it is desired to delay the time of expansion of the bentonite clay the completed pellets can be dipped or sprayed with urea-formaldehyde as disclosed in my copending application Serial No. 367,029, filed July 9, 1953. The following solution can be used to advantage for this purpose. One lb. of urea-formaldehyde can be added to 7.33 lbs. of water. This produces approximately one gallon of mixture or solution. To this there may be added .01 lb. of ammonium chloride and .01 lb. of ammonium sulphate. Where the ammonium chloride and ammonium sulphate are added the solution will produce a better coating on the pellets or pills.

In lieu of the above coating material the following may be used in the proportions of 425 ml. of benzene and 40 grams of dry polyvinyl acetate. These ingredients are mixed well and thereto is added 40 grams of aluminum stearate and mixed well. This produces approximately 500 ml. of mixture.

Either of the above-described coating mixtures produces a water-repellant film or coat of approximately .001" thickness for each application on the pellets, and on drying develops microscopic cracks and holes that allow water to enter slowly to combine with or wet the bentonite when the pellets are submerged in an aqueous solution or mixture such as the circulation fluid in a drilling well.

Each additional coat applied to the exterior surfaces of the pellets will further delay the time before the total expansion of the bentonite occurs. By using the polyvinyl acetate and aluminum stearate mixture a single coat will delay a 3/16" pellet at least fifteen minutes, while three coats will delay a 3/16" pellet for approximately 1½ hours. The polyvinyl acetate mixture is advantageously used as it is easily applied and dries very rapidly.

Another alternative composition embodying the present invention may be prepared as follows: For the water-repellant I use a 65% concentration of a viscous high polymeric silicone in methylene chloride. In other words, 65% dimethyl siloxane in methylene chloride. Such a solution is available commercially under the trade name of "De Cetex 104" by Dow-Corning Corporation of Midland, Michigan. Such a composition is soluble in aliphatic, aromatic, and chlorinated solvents and also casing head gasoline. I prepare a solution of dimethyl siloxane in methylene chloride and casing head gasoline by placing in a container 60 gallons of casing head gasoline with the boiling point of from 150° F. to 250° F. and add thereto five gallons of 65% dimethyl siloxane in methylene chloride (De Cetex 104). These ingredients are mixed well to prepare a solution which is approximately 5% concentration of dimethyl siloxane.

In lieu of De Cetex 104, General Electric silicon resin SR-53 may be employed. I find, however, that a 4% concentration of General Electric silicone resin SR-53 is about equivalent to a 5% concentration of De Cetex 104.

To each part by weight of dehydrated expandable type bentonite clay ground to approximately 100 mesh and finer, an equal part by weight of the solution prepared as above described is added. The ingredients are mixed well for approximately five minutes and the excess of the solution is then drained off. The bentonite is then heated to a temperature of approximately 300° F. for from four to fifteen minutes which is usually sufficient to drive off all of the casing head gasoline and the methylene chloride. Where General Electric silicone resin SR-53 is employed the bentonite may be dried at a temperature of approximately 250° F. The resulting composition is in the nature of a powder wherein each of the grains are coated with a water-repellant. To produce lumps, pellets, or pills, a suitable water-resistant adhesive is added to the powder. This water-resistant adhesive may be starch glue, animal glue, or a urea-formaldehyde adhesive. Virtually any air-drying adhesive can be used as the bonding agent for bonding the particles of the powder together into the form of lumps and which will hold the particles bonded to each other for a substantial period of time even though the bonding agent is subjected to water. The material is then formed or compressed into pellets of the desired size and length and is allowed to air-dry, after which the pellets are ready for use.

The lumps or pellets prepared in accordance with either of the methods above described are used by merely introducing them into the circulation fluid as it is pumped down the drill string. Where the lumps or pellets are equipped with additional outside coatings that are supplementary to the coatings on the individual particles, the number of coatings applied will be dependent to some extent on the depth at which it is suspected circulation has become lost. Thus, if circulation is lost near the bottom of a very deep well several outside coatings may be applied to the pellets. On the other hand, if circulation is lost in a relatively shallow well only a single outside coating may be employed or this may be dispensed with entirely.

The powder without a bonding agent can be introduced into the circulation fluid of the well and can be used advantageously in recovering lost circulation in "weepy" wells in that the particles of the powder are individually small enough to be carried into the small cracks and interstices through which water loss may be occurring. These individual particles lodge themselves therein, and although they are initially surrounded by a water-repellant, the resistance to water ingress to the bentonite clay particles does not continue indefinitely. Ultimately, water under the pressure and temperature conditions existing in the average well drilled by the rotary well drilling apparatus will penetrate the water-repellant, wet the bentonite clay, and cause the bentonite to swell and expand, thus plugging the cracks or interstices in the formation through which water loss is occurring.

When the material is fed into the circulation fluid in lump form it will be appreciated that even though external coatings may be broken off or abraded off, or the coatings on external practices forming the lump are broken or abraded off, that this merely exposes to the water ingredient of the circulation fluid the outermost bentonite clay particles, the subjacent or internal particles continue to be largely protected by the coatings on the individual particles. Even if the lumps become fractured those particles exposed on the fractured surface are usually protected by the coatings on the individual particles and even though the fracture may extend through an individual particle this particle is the only particle that is immediately wetted by the water in the circulation fluid. Other particles immediately behind will continue to be protected by their respective coatings.

Various changes may be in the details of the compositions without departing from the spirit and scope of the invention as defined by the appended claims.

I claim:

1. The method of recovering lost circulation in wells which comprises introducing into the well a water-containing circulation fluid having dispersed therethrough a multiplicity of finely divided, expandable-type dehydrated bentonite clay particles, 100 mesh and finer, which particles are individually coated with a water-repellant substance.

2. The method of recovering lost circulation in wells which comprises introducing into the well a water-containing circulation fluid having dispersed therethrough a multiplicity of finely divided, expandable-type dehydrated bentonite clay particles, 100 mesh and finer, which particles are individually coated with a water-repellant substance, said particles being held together in the form of lumps.

3. The method of recovering lost circulation in wells which comprises introducing into the well a water-containing circulation fluid having dispersed therethrough a plurality of lumps each lump composed of finely divided, expandable-type, dehydrated bentonite clay particles, which particles are individually coated with a water-repellant substance and are held thereby in lump form.

4. The method of recovering lost circulation in wells which comprises introducing into the well a water-containing circulation fluid having dispersed therethrough a multiplicity of finely divided, expandable-type bentonite clay particles each of which are individually coated with a highly polymeric silicone.

5. The method of recovering lost circulation in wells which comprises introducing into the well a water-containing circulation fluid having dispersed therethrough a multiplicity of finely divided, expandable-type bentonite clay particles each of which are individually coated with a highly polymeric silicone and being bonded together in the form of lumps.

6. The method of recovering lost circulation in wells which comprises introducing into the well a water-containing circulation fluid having dispersed therethrough finely divided, dehydrated, expandable-type bentonite clay particles each of which is coated with a coating principally composed of urea formaldehyde.

7. The method of recovering lost circulation in wells which comprises introducing into the well a water-containing circulation fluid having dispersed therethrough finely divided, dehydrated, expandable-type bentonite clay particles each of which is coated with a coating principally composed of urea formaldehyde and held together by the urea formaldehyde in the form of lumps.

8. A material for recovering lost circulation in wells comprising a multiplicity of finely divided, dehydrated, expandable-type bentonite clay particles, each of which is coated with a coating principally composed of urea-formaldehyde.

9. A material for recovering lost circulation in wells comprising a multiplicity of finely divided, dehydrated, expandable-type bentonite clay particles, each of which is coated with a coating principally composed of urea-formaldehyde and held together by the urea-formaldehyde in the form of a lump.

10. A material for recovering lost circulation in wells comprising a multiplicity of finely divided, dehydrated, expandable-type bentonite clay particles, each of which is coated with a coating principally composed of urea-formaldehyde and held together by the urea-formaldehyde in the form of a lump, which lump has at least one coating of urea-formaldehyde.

11. A material for recovering lost circulation in wells comprising a multiplicity of finely divided, dehydrated, expandable type bentonite clay particles 100 mesh and finer, each of said particles being individually coated with a high polymeric silicone.

12. A material for recovering lost circulation in wells comprising a multiplicity of finely divided, dehydrated, expandable type bentonite clay particles 100 mesh and finer, each of said particles being individually coated with a high polymeric silicone and being bonded together in the form of a lump.

13. A material for recovering lost circulation in wells comprising a multiplicity of finely divided, dehydrated, expandable type bentonite clay particles 100 mesh and finer, each of said particles being individually coated with a high polymeric silicone and being bonded together in the form of a lump by a water-resistant adhesive.

References Cited in the file of this patent

UNITED STATES PATENTS

| | | |
|---|---|---|
| 2,344,268 | Rench | Mar. 14, 1944 |
| 2,634,098 | Armentrout | Apr. 7, 1953 |
| 2,642,268 | Armentrout | June 16, 1953 |
| 2,647,892 | LaBrie et al. | Aug. 4, 1953 |
| 2,648,522 | Armentrout | Aug. 11, 1953 |
| 2,650,195 | Cardwell et al. | Aug. 25, 1953 |
| 2,689,166 | Rust et al. | Sept. 14, 1954 |
| 2,724,696 | Ratcliffe | Nov. 22, 1955 |
| 2,797,196 | Dunn et al. | June 25, 1957 |